3,591,325
PRODUCTS AND PROCESS FOR REMOVING ORGANIC PIGMENTS AND DYES FROM DYED AND PRINTED NATURAL AND SYNTHETIC TEXTILE MATERIALS
Ira Sapers, Maplewood, N.J., assignor to Arkansas Company, Inc., Newark, N.J.
No Drawing. Filed Apr. 25, 1969, Ser. No. 819,413
Int. Cl. D06l 3/00
U.S. Cl. 8—102                  10 Claims

ABSTRACT OF THE DISCLOSURE

A process for removing organic dyes and pigments, such as phthalocyanine, vat and azo pigments which are normally used with various binding agents, and also including fiber reactive dyes, any of which have been used to impart color or brightness to natural or synthetic textile materials, consisting of treating such textile materials in an aqueous medium containing sodium or potassium hydroxide, a reducing agent such as sodium hydrosulfite, and a stripping assist selected from the group including ethoxylated aliphatic or araliphatic long chain amines containing 12–20 carbon atoms in the aliphatic part, quaternized with an aromatic alkylating agent providing benzyl, halobenzyl, xylyl, or xylylhalide groups in the quaternary moiety, and the novel stripping assistants obtained in this way.

BACKGROUND OF THE INVENTION

Field of the invention

The present invention relates to an improved process and products for the removal of organic dyes and pigments, such as phthalocyanine, vat and azo pigments used together with suitable binders or fiber-reactive dyes, which have been used to impart color or brightness to natural or synthetic textile materials. in order to render the the textile materials suitable for re-use.

The prior art

In Sapers and Cook U.S. Pat. 3,074,774, a process was disclosed wherein quaternary compounds of ethoxylated aliphatic amines and aromatic alkylating agents are used in discharge pastes for printing pigment-dyed textile materials. Although the patented process appears superficially to be similar to the present process, this is not the case, since, as would be recognized by a person skilled in the art, discharge printing is in no way comparable or analogous to dye or pigment stripping in a bath according to the present invention. Discharge printing consists of removing color from parts of the dyed fabric according to a predetermined design to add sales appeal to a given textile material; the white discharge effect on the fabric being essential to the color scheme of the particular fabric. In discharge printing the discharge paste is carefully applied to the dyed fabric, by means of a screen in so called "screen-printing," or by printing machines containing large engraved metal rollers in so-called "roller-printing." In either case, the discharge paste is applied to a dry fabric, as opposed to the process of the present invention which is carried out in a bath. Care must be taken that the printed design does not contaminate or spread to the rest of the dyed fabric. The color discharge or removal is finally accomplished in a steam ager above atmospheric pressure. The present invention, on the other hand, relates to the removal of fiber-reactive dyes or other dyes or colored pigments, or brighteners from the entire fabric, as opposed to only certain carefully treated areas thereof. This is accomplished by immersing the entire fabric in an aqueous bath using conventional dyeing equipment, such as dyebecks, jigs, or the like. In processes of this type, which are known in the textile industry as "color stripping," the objective is to remove as much color as possible from the entire fabric in the shortest possible time. The auxiliary agents used in this process are usually called "stripping assistants." The discharge printing pastes described in Sapers and Cook U.S. Pat. 3,074,774, are not satisfactory for use as stripping assistants in the "color stripping" process of the present invention, for reasons which will be explained hereinafter.

BRIEF SUMMARY OF THE INVENTION

The present invention relates to certain quaternary ammonium compounds useful as stripping assistants in the removal of fiber-reactive dyes and other organic dyes, brightening agents, or pigments of the phthalocyanine, vat or azo types together with various binders from natural or synthetic textiles. The stripping assistants of this invention are different from and more efficient than those of Cook and Sapers U.S. Pat. 2,587,597, particularly for removal of phthalocyanine and vat pigments and fiber-reactive dyes.

The stripping assistants of this invention are obtained from primary aliphatic amines or araliphatic amines or diamines, which have been ethoxylated with 4 to 12 mols of ethylene oxide and then reacted with an aralkyl halide.

The stripping assistants of the present invention are reaction products which may be represented by the following formulae:

(a)

or (b)

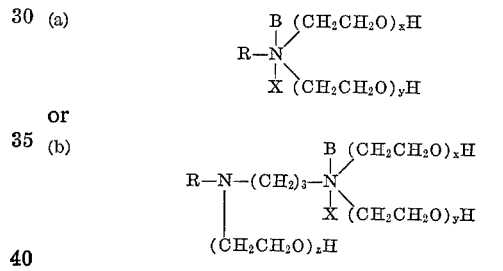

wherein R is a long aliphatic chain, preferably alkyl, containing 12–20 carbon atoms, which may or may not be substituted with a mononuclear aryl group such as phenyl, and wherein $x+y$ or $x+y+z$ is 4 to 12; B is benzyl, halobenzyl, xylyl or xylylhalide; and X is a halogen such as chlorine, bromine or iodine.

The preferred range of ethylene oxide (ETO) is 5–10 mols, and the halogen substituents of B may be chlorine, bromine or iodine.

While ethoxylated amines containing 2–30 mols of ethylene oxide (ETO) were disclosed in U.S. Pat. 3,074,774, it will be seen from the actual Examples I, II, III and IV, that essentially, only those containing 2 mols of ETO, i.e., the lowest amount of ETO in the range are employed in the working examples. The corresponding arylated quaternaries are highly desirable for discharge printing as seen in Examples I–IV of the patent. However, when such arylated compounds, containing only about 2 mols of ETO, are used in a stripping bath containing caustic soda, they are ineffective for the purposes of this invention. More specifically, such compositions are insufficiently soluble in the bath, tend to be deposited on the fabric, and provide very poor stripping action. Therefore, it can be seen that the preferred compositions of U.S. Pat. 3,074,774, are ineffective as stripping assistants. It has now been found that the best results, for stripping purposes, can be achieved with arylated quaternaries of 12–20 carbon-atom ethoxylated amines containing 4 to 12 mols of ethylene oxide. If ethoxylated amines of higher molar weights are used, their quaternaries have been found to lose efficiency in direct proportion to their increase in molar weight.

In general, the stripping agents of the present invention are employed in aqueous stripping baths at a concerntration of about 0.2 to 2.0 percent or preferably about 0.25 to 1.5 percent of stripping agent based upon the weight of the total bath. The stripping baths are alkaline and contain about 0.5 to 2.0 percent and preferably about 1.0 to 1.5 percent of a caustic alkali such as sodium or potassium hydroxide, and about 0.25 to 1.5 percent and preferably about 1.0 to 1.5 percent of an alkali metal hydrosulfite such as sodium hydrosulfite as a reducing agent, additional hydrosulfite may be added during the course of reaction to maintain the bath in the reduced state. About 0.005 to 0.02 percent of anthraquinone may be added as an accelerator, if desired, but this is not essential. the stripping baths are normally employed at initial temperatures between about 130–150° F. and then raised to an effective stripping temperature up to and including the boiling temperature of the bath and treatment is carried out for periods of about 30 minutes to 2 hours, or as necessary to remove substantially all of the color from the treated fabic.

The reaction products useful as stripping assistants in the present invention can be obtained by the procedures described in Sapers and Cook U.S. Pat. 3,074,774. It will be understood, by those skilled in the art, that the aforesaid products are not necessarily pure chemical substances. Indeed, in practice and as a practical matter, the products are often mixtures, components of which need not all have the aforementioned formulae as explained in U.S. Pat. 3,074,774.

PREPARATION OF THE PRODUCTS

Example 1

| | Parts |
|---|---|
| Ethoxylated tallow propylene diamine, 10 mols ETO (Ethoduomeen T/20; Armour Chemical) | 125 |
| Benzyl chloride | 37 |

The above mixture was heated to 125° C. in a 3-neck reaction flask equipped with stirrer condenser and thermometer and the reaction was continued at 120°–140° C. for 3.5 hours. Heating was then discontinued and the viscous liquid reaction product was discharged.

Example 2

Ethoxylated phenyl stearyl amine,

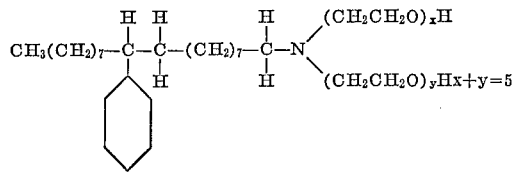

(Ethomeen L-PS/15; Armour Chemical) ........ 125 parts.

Benzyl chloride ........ 28.5 parts.

In this example the reaction procedure was similar to that of Example 1, except that the reaction mixture was heated 30 minutes at 105°–110° C., 30 minutes at 115°–120° C., 60 minutes at 125°–130° C., 60 minutes at 105°–110° C.

Example 3

| | Parts |
|---|---|
| Ethoxylated tallow amine, ETO–5 mols | 200 |
| Benzyl chloride | 55 |

A mixture of the above ingredients was heated to 75° C. in 3-neck reaction flask equipped with stirrer condenser and thermometer and the reaction was continued 10 hours at 75°–80° C.

Example 4

| | Parts |
|---|---|
| Ethoxylated stearyl amine, ETO–5 mols | 150 |
| Benzyl chloride | 42 |

The reaction procedure here was the same as in Example 3 except that the reaction mixture was heated 14 hours at 70°–80° C.

Example 5

| | Parts |
|---|---|
| Ethoxylated stearyl amine, ETO–10 mols | 200 |
| Benzyl chloride | 38 |

In this example the reaction procedure was similar to that of Example 1, except that the reaction mixture was heated 30 minutes at 125°–130° C. and 120 minutes at 110°–115° C. The total reaction time was 5 hours.

Example 6

| | Parts |
|---|---|
| Ethoxylated coco amine, 5 mols ETO | 150 |
| Benzyl chloride | 42 |

Reaction procedure similar to Example 4.

In all cases, a viscous liquid reaction product was obtained.

Example 7

| | Parts |
|---|---|
| Products of Example 2 | 1.2 |
| Sodium hydroxide, 10% solution | 20.0 |
| Sodium hydrosulfite | 2.0 |
| Bath ratio 20:1 Water | 176.8 |
| | 200.0 |

A piece of cotton fabric printed with large flowers of blue, green, yellow, orange, and pink, on a white background, was immersed in the above bath at 150° F., heated to the boil and boiled 30 minutes. Bath was dropped, and the stripped fabric was rinsed thoroughly. The fabric was squeezed and dried. All the pigments were removed from the fabric, except for a faint outline of yellow and violet.

Note: In this and all subsequent examples, the ratio of stripping bath to fabric is 20:1.

Example 8

A stripping bath was prepared at 130° F. as follows:

| | Parts |
|---|---|
| Product of Example 4 | 1.5 |
| Sodium hydroxide, 10% solution | 20.0 |
| Sodium hydrosulfite | 2.0 |
| Water | 176.5 |
| | 200.0 |

A heavy cotton upholstery fabric printed over the entire surface with pigments, ranging in color from light blue to dark navy, was immersed in the above bath, and stripping procedure was followed according to Example 6, except that after 15 minutes boiling, 0.125% sodium hydrosulfite was added and boiling was continued for 15 minutes. An additional 0.125% sodium hydrosulfite was then added and boiling was continued for another 30 minutes. All of the blue pigments were removed from the fabric.

Example 9

|  | Parts |
|---|---|
| Product of Example 1 | 2.5 |
| Sodium hydroxide, 10% solution | 20.0 |
| Sodium hydrosulfite | 2.0 |
| Water | 175.5 |
|  | 200.0 |

A sample of printed fabric identical with that used in Example 8 was immersed in the above bath which was heated to the boil and the sample boiled 15 minutes. 0.5 part sodium hydrosulfite was added and boiling continued for an additional 30 minutes. The bath was dropped and the fabric rinsed well and dried. All the blue pigments were removed from the fabric.

Example 10

|  | Parts |
|---|---|
| Product of Example 5 | 2.0 |
| Sodium hydroxide, 10% solution | 20.0 |
| Sodium hydrosulfite | 2.0 |
| Water | 176.0 |
|  | 200.0 |

A cotton upholstery fabric printed over its entire surface with patterns of greenish-blue, green, red, and violet, and in which the greenish-blue predominated, was immersed in the above bath, heated to the boil and boiled for 30 minutes. The bath was dropped and the fabric rinsed well and dried. The red color was stripped (removed) completely, the greenish-blue and green were stripped to light beige, and the deep violet was stripped to a light lavender.

Example 11

|  | Parts |
|---|---|
| Product of Example 3 | 1.1 |
| Sodium hydroxide, 10% solution | 20.0 |
| Sodium hydrosulfite | 2.0 |
| Water | 176.9 |
|  | 200.0 |

A cotton corduroy fabric dyed a greenish-blue with fiber-reactive dyes, was immersed in the above bath at 145° F., the bath was heated to the boil and the sample boiled 15 minutes. 0.25 part sodium hydrosulfite was adde and boiling was continued for an additional 30 minutes. The bath was dropped and the fabric rinsed well and dried. The whole color was practically removed, except for a slight greenish residue.

Example 12

A stripping bath was prepared at 150° F., as follows:

|  | Parts |
|---|---|
| Product of Example 3 | 1.3 |
| Sodium hydroxide, 10% solution | 20.0 |
| Sodium hydrosulfite | 2.0 |
| Water | 176.7 |
|  | 200.0 |

A cotton fabric printed with blue, green, and yellow pigments on a white background, was immersed in the above bath, which was heated to the boil and boiled 15 minutes. 0.25 part sodium hydrosulfite was added and boiling continued for an additional 20 minutes. The bath was dropped and the fabric rinsed well and dried. Only a faint straw color outline of the pattern remained.

Another novel and unexpected advantage of the products of this invention, is their ability to remove certain fluorescent brightening agents from treated fabrics. This is an important property since it is not unusual for too much brightener to be inadvertently applied to a fabric, thus requiring its partial removal to salvage of the fabric.

Example 13

A stripping bath was prepared at 120° F., as follows:

|  | Parts |
|---|---|
| Product of Example 6 | 0.250 |
| Soda ash | 0.300 |
| Water | 199.450 |
|  | 200.000 |

Ten parts of bleached 80 x 80 cotton, which had been treated with a concentrated stilbene type fluorescent brightener, in an amount equivalent to 1.0% by weight of the fabric, was immersed in this bath, heated to the boil and boiled 30 minutes. The bath was dropped and the fabric rinsed well and dried. Approximately 75% of the brightener was removed from the fabric.

It will be seen from the specific examples above that the stripping assistants and method of the present invention serve to remove all types of difficultly removable organic dyes and pigments, including fiber-reactive dyes and phthalocyanine, vat and azo pigments, either completely or to very low levels of coloration acceptable in commercial stripping operations to render the fabrics reusable. In those cases, where color removal is incomplete and faint colors or stain patterns remain, an optional bleach treatment with mild sodium hypochlorite at room temperature for 20–30 minutes following stripping may be employed, if necessary, to reduce the residual color to a level permitting redyeing of the fabric even in very light shades.

What is claimed is:

1. In a process for stripping organic dyes and pigments from textile materials in an aqueous bath at a temperature in the range of about 130° F. to the boiling point of said bath for a period in the range of about 30 minutes to about 2 hours, said bath containing about 0.2 to 2.0 percent of a stripping assistant, about 0.5 to 2.0 percent of caustic alkali and about 0.25 to 2.0 percent of an alkali metal hydrosulfite, the improvement which comprises: employing as the stripping assistant the quaternary ammonium reaction product of an amine selected from the group consisting of phenyl stearyl amine, tallow amine, stearyl amine and coco amine, said amine being ethoxylated with an average of about 5–10 mols of ethylene oxide and quaternized with benzyl chloride.

2. A process according to claim 1, wherein said amine is ethoxylated with an average of about 5 mols of ethylene oxide.

3. A process according to claim 1, wherein the amine is phenyl stearyl amine.

4. A process according to claim 3, wherein said amine is ethoxylated with an average of about 5 mols of ethylene oxide.

5. A process according to claim 1, wherein the amine is tallow amine.

6. A process according to claim 5, wherein said amine is ethoxylated with an average of about 5 mols of ethylene oxide.

7. A process according to claim 1, wherein the amine is stearyl amine.

8. A process according to claim 7, wherein said amine is ethoxylated with an average of about 5 mols of ethylene oxide.

9. A process according to claim 1, wherein the amine is coco amine.

10. A process according to claim 9, wherein said amine is ethoxylated with an average of about 5 mols of ethylene oxide.

References Cited

UNITED STATES PATENTS

| | | |
|---|---|---|
| 2,587,597 | 3/1952 | Cook et al. |
| 3,074,774 | 1/1963 | Sapers et al. |

LEON D. ROSDOL, Primary Examiner

A. I. RADY, Assistant Examiner

U.S. Cl. X.R.

8—15, 69